United States Patent
Hecht et al.

[19]

[11] Patent Number: 5,814,802
[45] Date of Patent: Sep. 29, 1998

[54] HIGH SPEED IMAGING APPARATUS FOR CCD BASED SCANNERS

[75] Inventors: Kurt Hecht, Hartsville; Richard A. Di Domizio, Hatfield, both of Pa.

[73] Assignee: Accu-Sort Systems, Inc., Telford, Pa.

[21] Appl. No.: 606,426

[22] Filed: Feb. 23, 1996

[51] Int. Cl.$^6$ .................................................. G06K 7/10
[52] U.S. Cl. ...................... 235/455; 235/472; 250/205; 250/568
[58] Field of Search ..................................... 235/454, 455, 235/474, 462; 250/223 R, 568, 205

[56] References Cited

U.S. PATENT DOCUMENTS

| | | | |
|---|---|---|---|
| 3,663,800 | 5/1972 | Meyer et al. | 235/61.11 E |
| 3,977,784 | 8/1976 | Hara | 355/67 |
| 4,248,517 | 2/1981 | Nishikawa | 355/1 |
| 4,920,255 | 4/1990 | Gabeler | 235/454 |
| 4,988,852 | 1/1991 | Krishnan | 235/462 |
| 5,003,189 | 3/1991 | Vala et al. | 250/566 |
| 5,059,860 | 10/1991 | Sato et al. | 313/488 |
| 5,235,167 | 8/1993 | Dvorkis et al. | 235/462 |
| 5,241,164 | 8/1993 | Pavlidis et al. | 235/462 |
| 5,245,172 | 9/1993 | Esslinger et al. | 250/201.2 |
| 5,343,296 | 8/1994 | Hellstrom | 356/436 |
| 5,343,629 | 9/1994 | Rae | 34/278 |
| 5,384,451 | 1/1995 | Smith et al. | 235/462 |
| 5,392,100 | 2/1995 | Yoshida | 355/235 |
| 5,430,282 | 7/1995 | Smith et al. | 235/455 |

FOREIGN PATENT DOCUMENTS

| | | | |
|---|---|---|---|
| 0331328A2 | 9/1989 | European Pat. Off. | H04N 1/40 |
| 2201784 | 8/1988 | United Kingdom . | |
| WO9301566 | 1/1993 | WIPO | G06K 19/06 |

OTHER PUBLICATIONS

IBM Technical Disclosure Bulletin, vol. 27, No. 7A, Dec. 1984, Grant et al.

*Primary Examiner*—F. L. Evans
*Attorney, Agent, or Firm*—Volpe and Koenig, P.C.

[57] ABSTRACT

A high speed imaging apparatus for CCD based scanners comprises a housing having separate compartments which complement modular assemblies installed therein. A decoder compartment houses components associated with locating and decoding an image. An optics compartment houses the mirrors and associated optics for reflecting the subject image onto the CCD detector. A lighting compartment includes high intensity lamps and the associated components for illuminating an object to be imaged. The lighting compartment includes a heat management system which removes the heat from the high intensity lamps and prevents heat from migrating to other compartments within the housing.

17 Claims, 8 Drawing Sheets

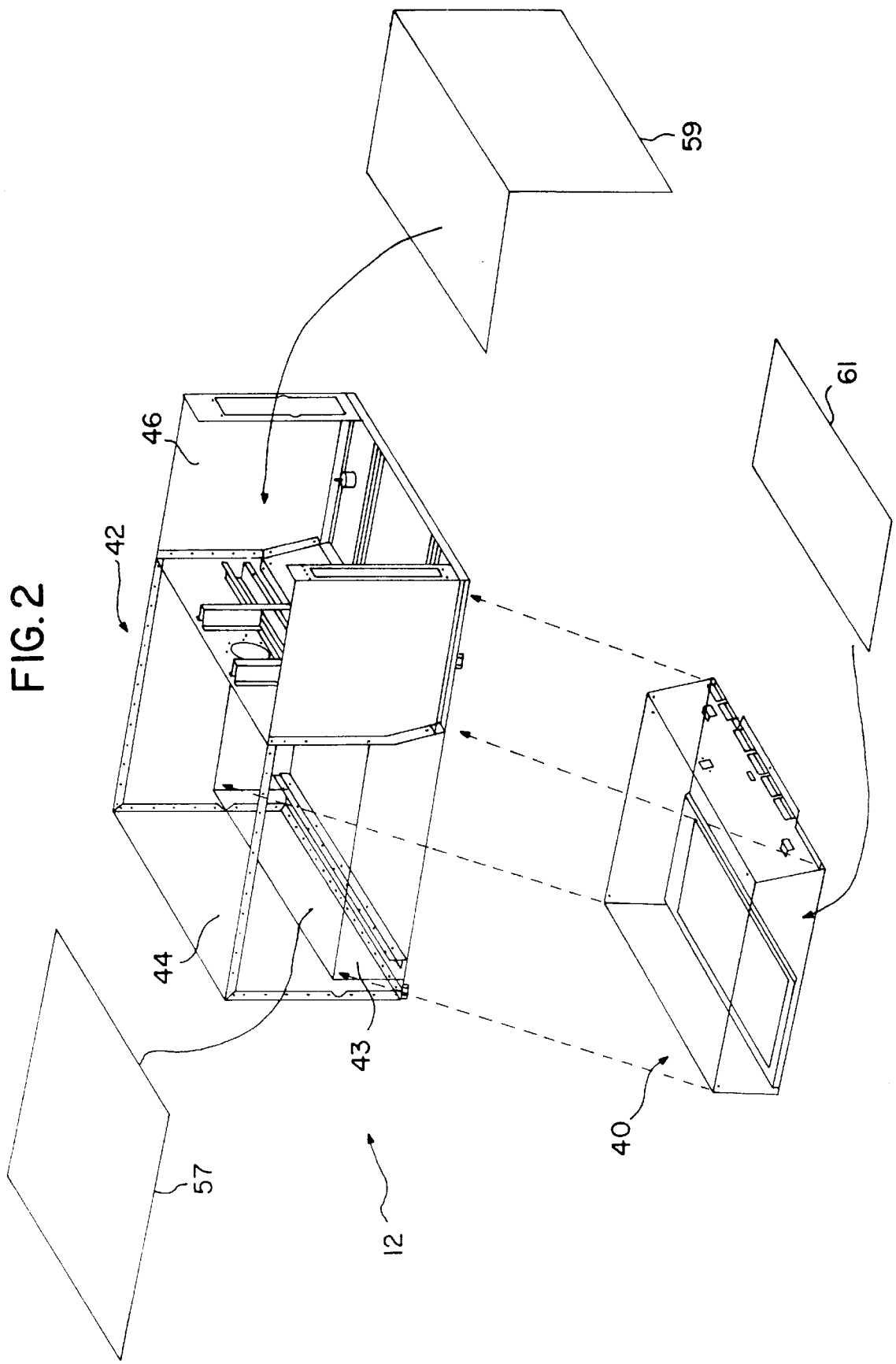

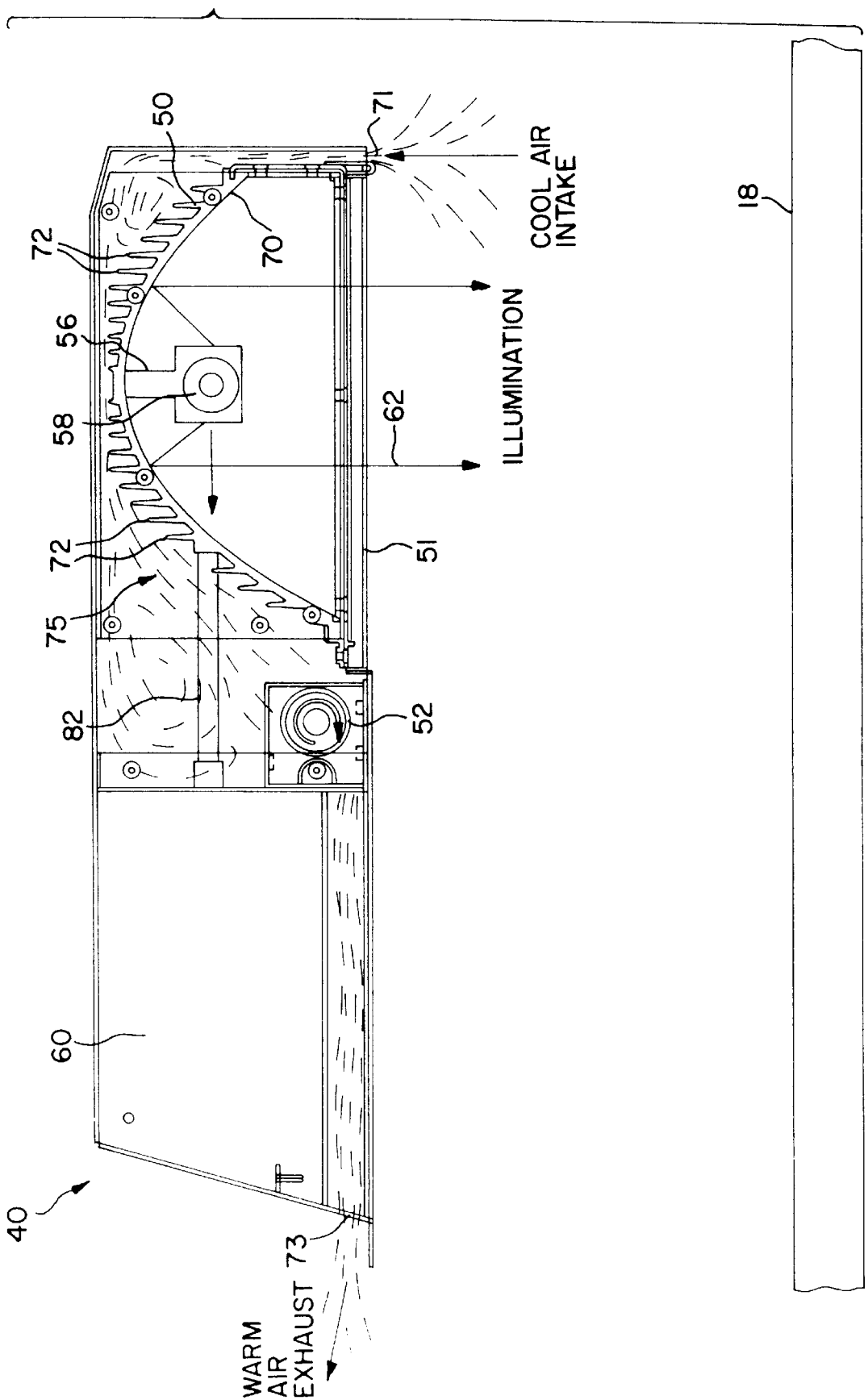

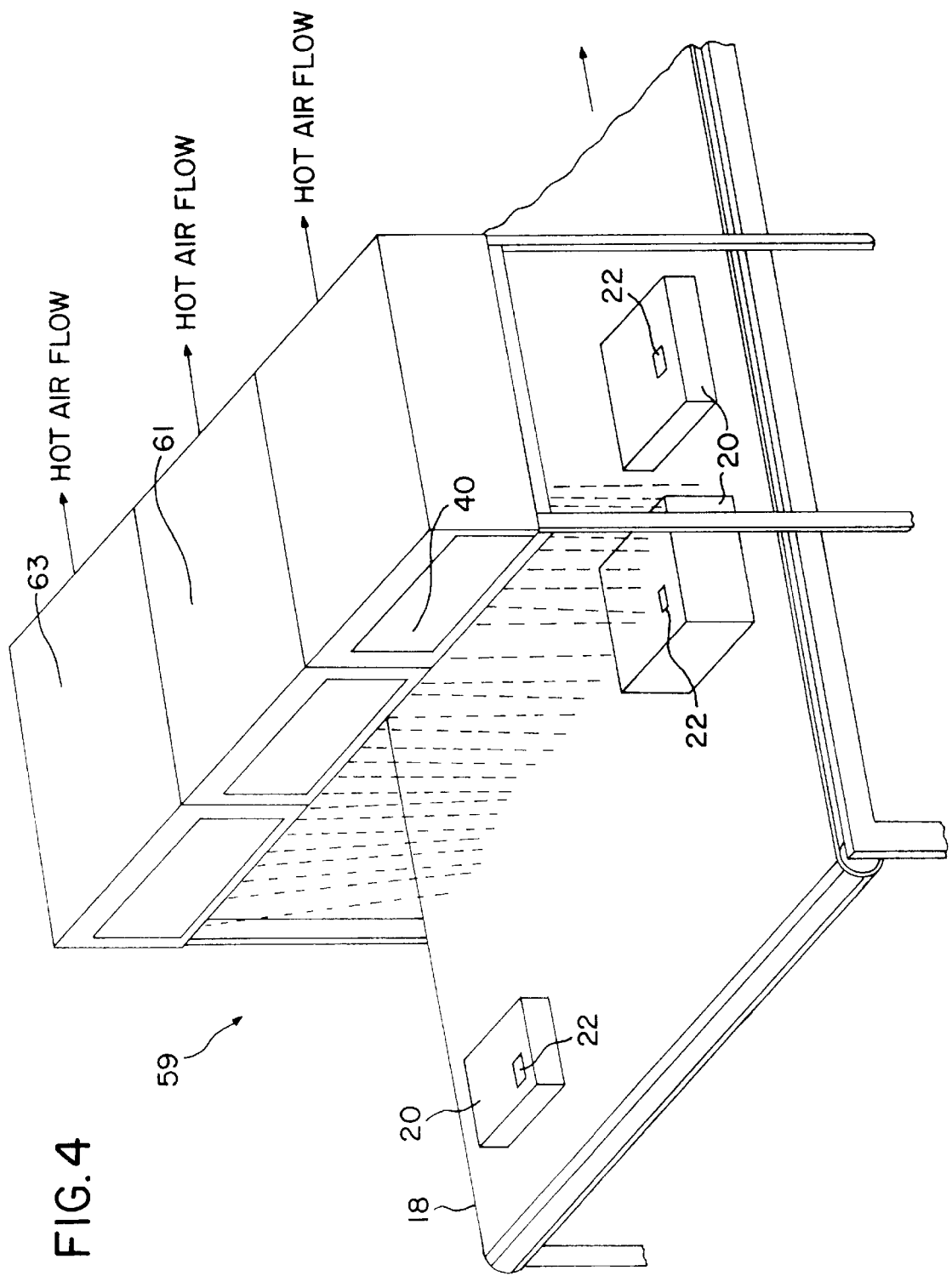

HIGH SPEED IMAGING APPARATUS FOR CCD BASED SCANNERS

BACKGROUND OF THE INVENTION

1. Field of the Invention

The present invention generally relates to an apparatus for illuminating coded information symbols. More particularly, the present invention relates to a high speed imaging apparatus for CCD based scanners.

2. Description of Prior Art

There are many difficulties associated with imaging objects or bar code symbols and other machine readable symbologies on packaging. Erroneous imaging of a human or machine readable symbology may be the result of poor printing of the symbology on a label or extraneous markings or contaminants located on the label. However, erroneous imaging is often the result of poor lighting conditions. Proper illumination is one of the most important requirements for any machine imaging system.

The illumination of an object or a label is particularly critical for high speed scanning systems that employ CCD detectors. As is well known by those skilled in the art, the ability of CCD scanning systems to accurately detect an object depends upon the amount of light that is reflected from the region of interest onto the CCD detector. The amount of light detected by the CCD detector is a function of both the integration period and the intensity of illumination.

Many current imaging systems in the material handling field include variable speed conveyors, wherein the conveyor speed varies with the volume of packages handled by the system. If a low intensity illumination level is selected for low speed conveyor operation, the same illumination level may be insufficient for accurate imaging when the conveyor speed is increased. If a high intensity illumination level is selected, the light may saturate the CCD detector when the conveyor is operating at low speeds.

High intensity illumination sources have also been known to generate tremendous amounts of heat, thus creating "wave distortions" which may inhibit the ability of a CCD detector based system to accurately resolve the image. Additionally, the high intensity sources create an annoyance and even a safety hazard to nearby operators.

Accordingly, there exists a need for an illumination assembly which provides the desired illumination for operation of a conveyor at any speed.

SUMMARY OF THE INVENTION

The present invention is a high speed imaging apparatus used for CCD based image acquisition systems. The apparatus comprises a housing having separate compartments which complement modular assemblies installed therein. A decoder compartment houses a CCD camera head unit and components associated with locating and detecting and decoding an image. An optics compartment houses the mirrors and associated optics for reflecting the image onto the CCD detector. A lighting compartment includes high intensity lamps and the associated components for illuminating the object to be imaged. The lighting compartment includes a heat management system which removes the heat from the high intensity lamps and prevents heat from migrating to other compartments within the housing.

Accordingly, it is an object of the invention to provide an illumination assembly which provides the optimum amount of illumination according to the demands placed upon the system.

It is a further object of the invention to provide a high speed imaging apparatus with an effective heat management system.

Other objects and advantages will become apparent to those skilled in the art after reading the detailed description of a presently preferred embodiment.

BRIEF DESCRIPTION OF DRAWINGS

FIG. 2 is a perspective view of the modular illumination assembly of the present invention;

FIG. 3A is a side view of the lighting assembly of FIG. 2;

FIG. 4 is a perspective view of a plurality of modular illumination assemblies located in parallel;

DETAILED DESCRIPTION OF THE PREFERRED EMBODIMENT

Figure 1:
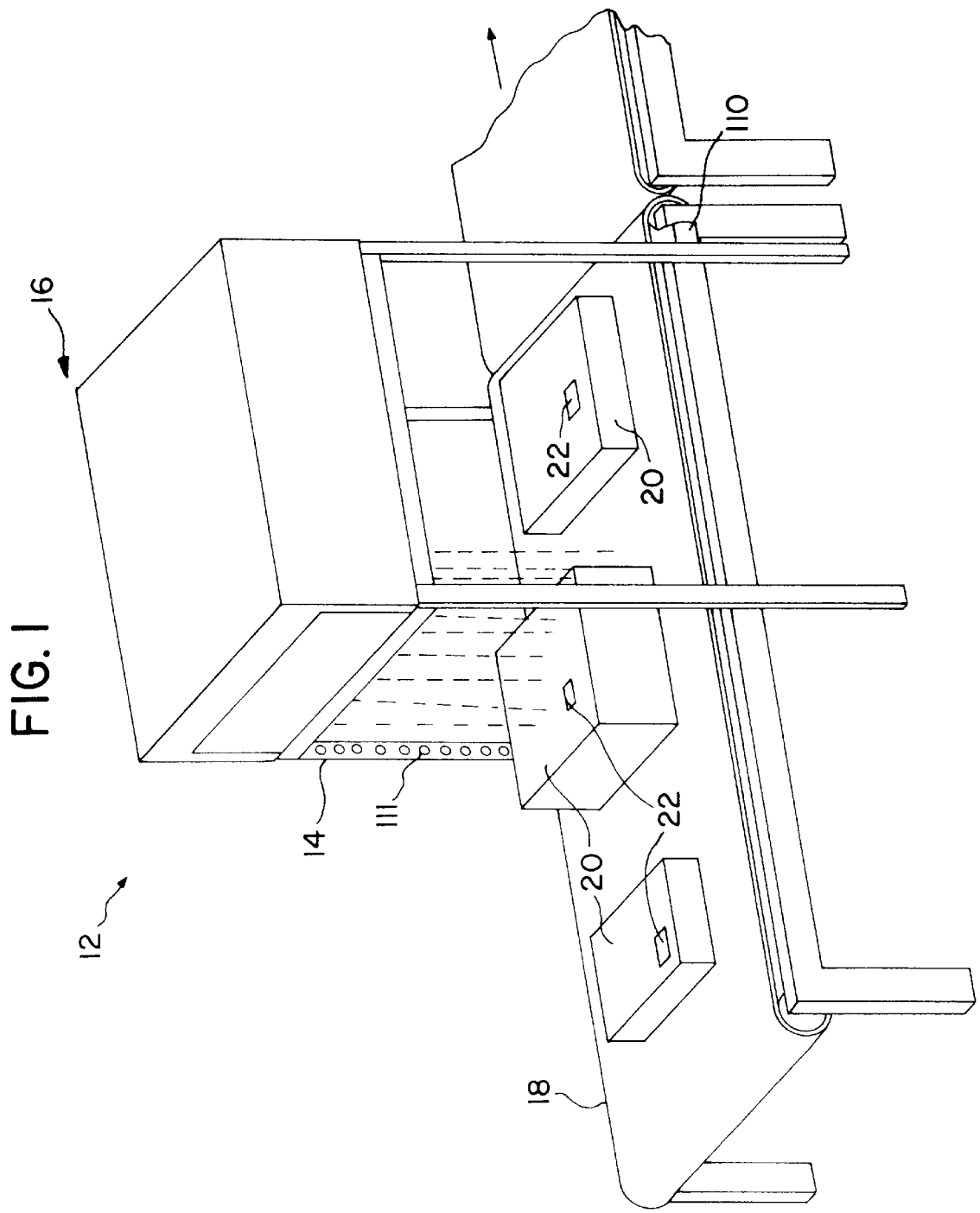
FIG. 1 is a perspective view of the high speed imaging apparatus of the present invention.

The preferred embodiment will be described with reference to the drawing figures where identical numerals represent the same element throughout. A high speed imaging apparatus 12 in accordance with the present invention is shown in FIG. 1. The imaging apparatus 12 comprises a frame 14 which supports a main housing 16 above a conveyor 18. As packages 20 travel along the conveyor 18, they pass under the housing 16. The packages 20 are illuminated to facilitate the detection of the packages 20 and any human or machine readable symbologies located thereon, such as a bar code 22. For simplicity, the invention will be described with reference to the detection and decoding of bar codes. However, the present invention is applicable to any type of system for imaging objects or imaging human and machine readable symbologies.

There are many factors which can affect the ability of the apparatus 12 to accurately detect each bar code label 22; including the speed of the conveyor 18, the illumination intensity, and the ability of the apparatus 12 to accurately focus on the subject bar code label 22. These factors are considered by the imaging apparatus 12 of the present invention in illuminating and detecting bar code symbols.

Referring to FIG. 2, the imaging apparatus 12 made in accordance with the teachings of the present invention is shown. The apparatus 12 includes a lighting assembly 40 and a main housing 42. The main housing 42 comprises three separate compartments: 1) an optics compartment 44; 2) a decoder compartment 46; and, 3) a lighting compartment 43. Access hatches 57, 59, 61 are also provided for easy access to components within each compartment 43, 44, 46.

The optics compartment 44 houses the mirrors and associated optics for reflecting an image of the subject bar code label 22 onto a CCD detector. The decoder compartment 46 houses the components, such as a CCD camera head unit and the image processing architecture which is used for detecting and decoding the bar code image. The decoder compartment 46 may be configured to house different types of CCD detectors from any manufacturer.

The lighting compartment 43 compliments the lighting assembly 40 for securing the lighting assembly 40 to the main housing 42. Referring to FIG. 3A, the lighting assembly 40 includes a combination reflector/heatsink 50, a window 51, a cross-flow blower 52, lamp sockets 56, lamps 58 and an electronics compartment 60. The lamps 58 provide the source of illumination 62 for bar code detection. The lamp sockets 56 secure the lamps 58 in place and provide electrical power to the lamps 58. Preferably, there are two lamps 58 and each lamp 58 is of the 400 watt high pressure sodium type.

In order to utilize as much of the output from the lamps 58 as possible, a combination reflector/heatsink 50 is utilized. The combination reflector/heatsink 50 is an aluminum extrusion which is polished to a reflective mirrored surface 70 on one side and includes heatsink fins 72 on the other side. The combination reflector/heatsink 50 provides a simple and inexpensive means for both light reflection and heat removal. With respect to light reflection, illumination emitted from the lamps 58 in a direction away from the conveyor 18, will be redirected by the reflector/heatsink 50 through the window 51 and toward the conveyor 18.

The plurality of heatsink fins 72 provide structural rigidity to the reflector/heatsink 50. Thus, the reflector/heatsink 50 will not substantially deform even in harsh environmental conditions. This is a significant advantage over prior art reflectors which typically comprise thin reflective materials supported by a frame or other structure. These prior art reflector assemblies can be easily dented or deformed, thus permitting light to be misdirected.

With respect to heat removal, since the reflector 50 is also a heatsink 50, heat removal is extremely efficient. Heat removal is further effected by a laminar air flow 75 across the heatsink fins 72. The cross-flow blower 52 draws air through the cool air intake plenum 71 from underneath the lighting assembly 40 and across the heatsink fins 72. The heated air is discharged out the back of the lighting assembly 40 through a warm air exhaust plenum 73. The laminar air flow 75 cools the back and top of the reflector/heatsink 50. The laminar air flow 75 also prevents the build-up of heat in the lighting assembly 40 which would eventually migrate to the optics compartment 44 and create optical distortions due to heatwaves or an "oasis effect".

The cross-flow blower 52 is effective not only in cooling the combination reflector/heatsink 50, but also in directing the hot air away from adjacent bar code scanners 61, 63. Accordingly, several lighting assemblies may be placed in parallel for a wide conveyor system 59 as shown in FIG. 4.

Figure 3B:
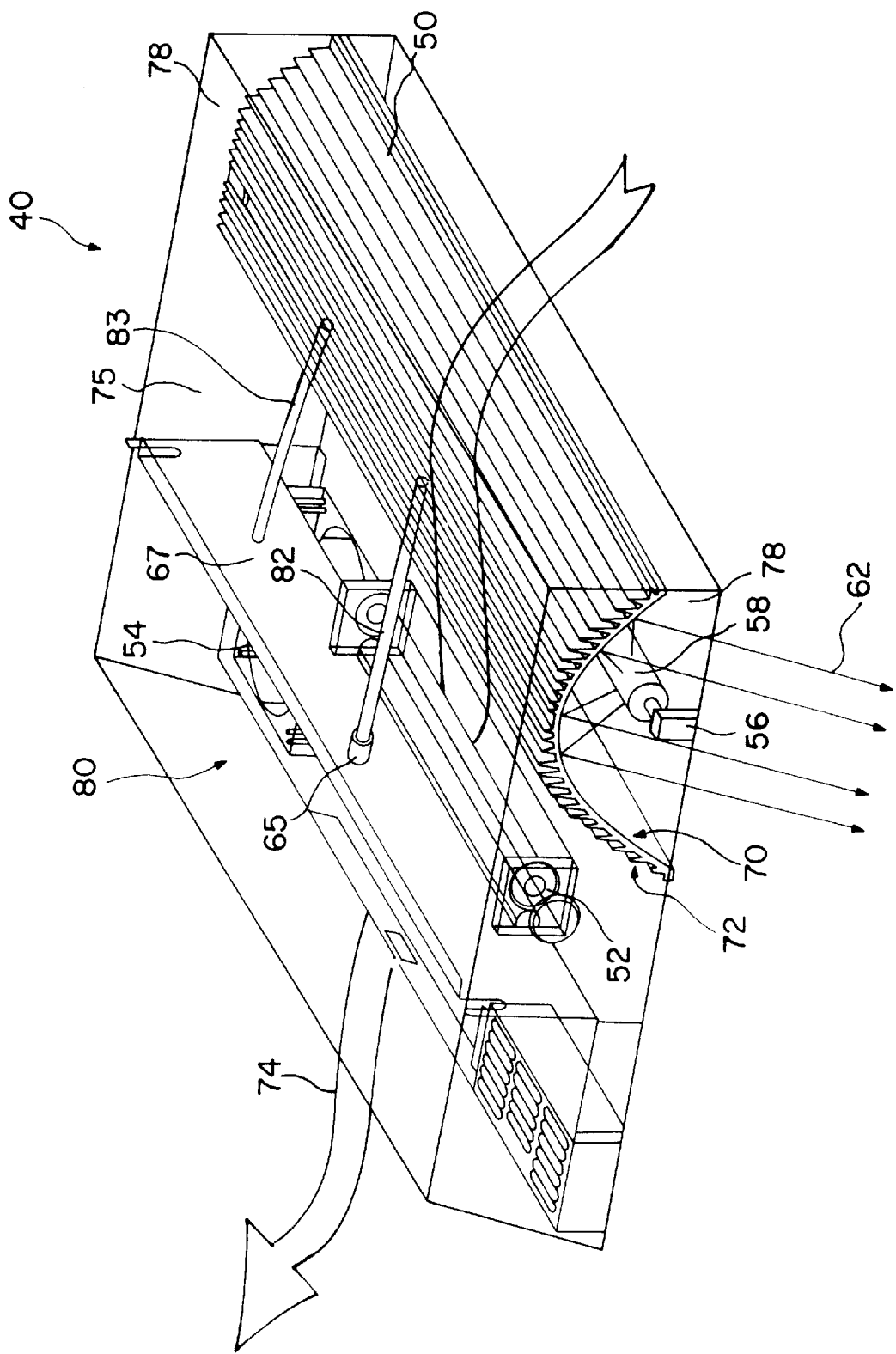
FIG. 3B is a perspective view of the lighting assembly of FIG. 2.

Referring to FIG. 3B, the lighting assembly 40 is shown in greater detail. The laminar air flow 75 thermally isolates the reflector/heatsink 50 from other portions of the lighting assembly 40. This effectively prevents thermal degradation of components in the electronics compartment 60 which are more susceptible to damage from heat related stress. A fan 54 removes any remaining heat from the electronics compartment 60.

It should be appreciated by those of skill in the art that not all of the heat generated by the lamps 58 will be removed by the laminar air flow. Cooling of the reflector/heatsink 50 is further enhanced by direct suspension of the reflector/heatsink 50 at the side walls 78 of the lighting assembly 40. This permits the remaining heat to be radiated out along the heat fins 72 and onto the side walls 78.

In order to monitor the intensity of the lamps 58, a light intensity feedback system 80 is employed. The system 80 comprises a light pipe 82, 83, for each lamp 58 which conducts a portion of the illumination from each lamp 58 to a photo sensitive device such as a photo resistor 65, 67 which is located in the electronics compartment 60 of the lighting assembly 46. The light pipes 82, 83 are thermally conductive tubes which are selectively placed within the same laminar air flow 75 that cools the reflector/heatsink 50. Each photo resistor 65, 67 monitors the illumination transmitted by its respective light pipe 82, 83 and provides an electrical output corresponding to the relative illumination intensity for that lamp 58. This provides a feedback arrangement whereby the illumination of each lamp 58 may be individually monitored and controlled, as will be described in greater detail hereinafter. The use of the conductive light pipes 82, 83 permits the photo resistors 65, 67 to directly monitor the relative intensity of the lamps 58 while minimizing the undesired effects of heat related degradation which would be caused by locating the photo resistors 65, 67 in close proximity to the lamps 58.

The modular design of the present invention provides significant advantages over prior art systems. Since the main housing 42 provides three separate compartments, (the optics compartment 44, the decoding compartment 46 and the lighting compartment 43), components within each compartment 43, 44, 46 may be removed without disturbing components in other compartments. The modular design of the lighting assembly 40 provides for quick removal and replacement. Additionally, the compartmentalization of the main housing 42 provides distinct thermal separation between compartments 43, 44, 46, thus minimizing any adverse effects upon electrical components from heat generated by the lamps 58.

Figure 5:
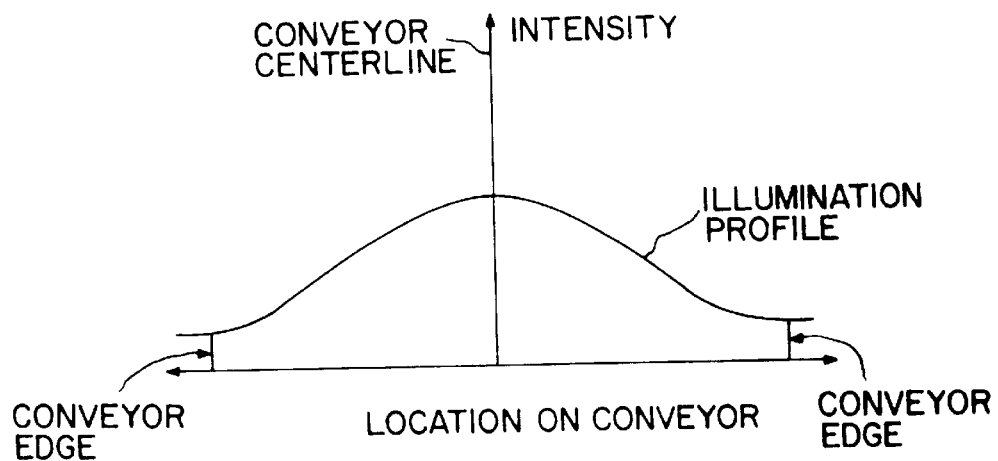
FIG. 5 is a graphical representation of the illumination profile of a prior art lighting unit.

One of the common problems associated with prior art lighting units is that the illumination emitted by these lighting units has an uneven profile as shown in FIG. 5. The illumination intensity tends to be greater near the middle of the profile and tapers off at the ends of the profile, which typically coincides with the outer edges of the conveyor 18.

Figure 6:
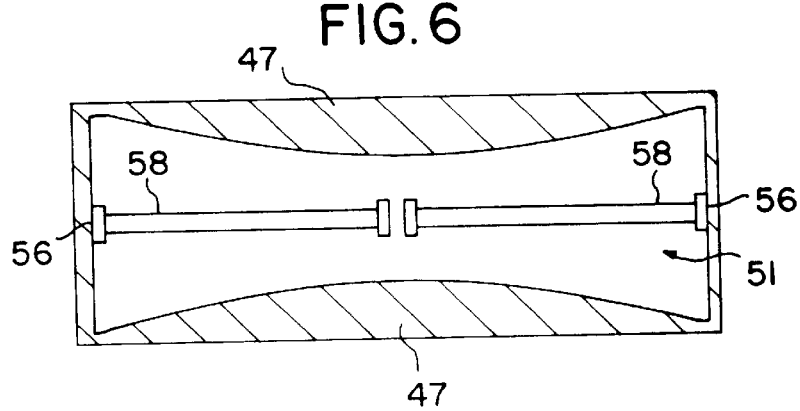
FIG. 6 is a plan view of the window of the lighting assembly including an aperture.
Figure 7:
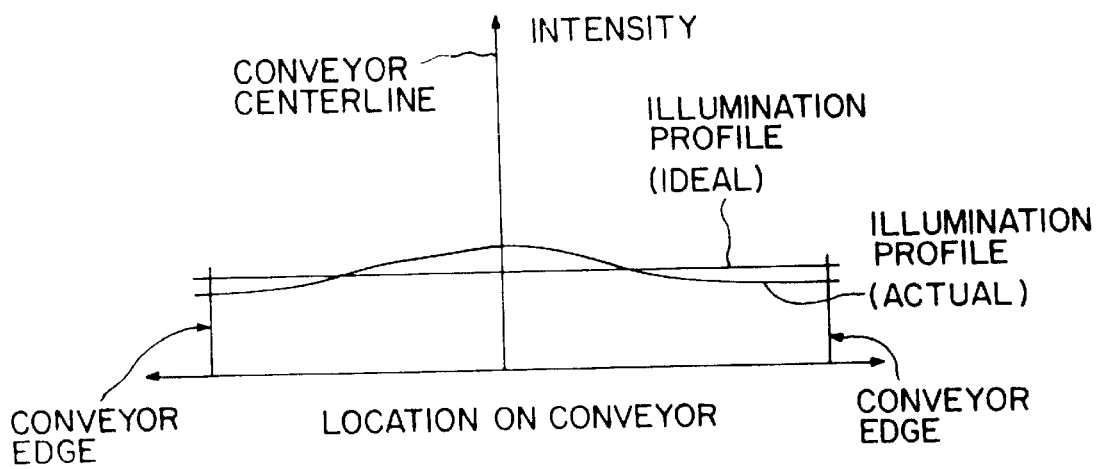
FIG. 7 is a graphical representation of the illumination profile of the lighting assembly of the present invention.

Referring to FIG. 6 the lighting assembly 40 of the present invention employs an aperture for equalizing the illumination intensity across the width of the illumination profile. The aperture 47 reduces the intensity of the illumination at the center of the illumination profile, but does not substantively affect the illumination at either end of the illumination profile. Accordingly, a more even illumination profile as shown in FIG. 7 is achieved. An even illumination profile increases the performance of the imaging apparatus 12 by permitting the acquisition of higher quality, more uniform CCD images. As would be appreciated by those of skill in the art, the shape of the aperture 47 may be modified to achieve a different illumination profile, depending upon the profile desired for a specific application.

Figure 8:
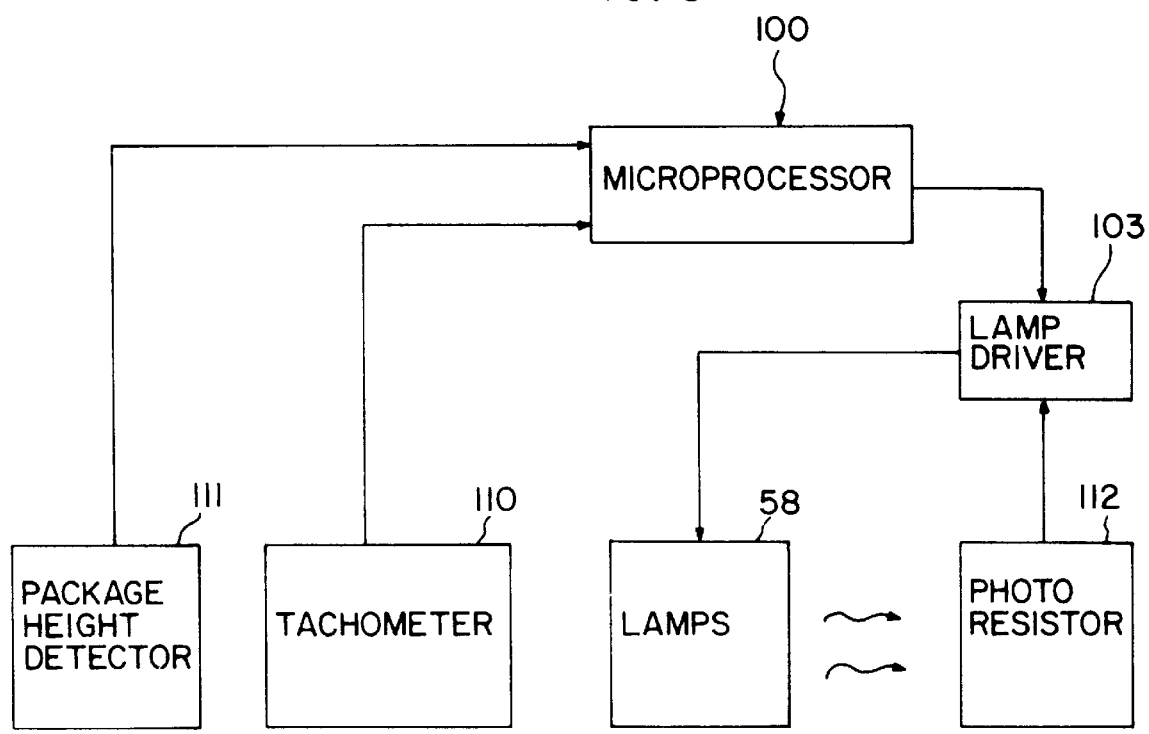
FIG. 8 is a block diagram of the illumination intensity control system of the present invention.

The ability to individually control the intensity of the lamps 58 is also critical in assuring proper operation of the CCD detector. Referring to FIG. 8, a microprocessor 100 is used to determine an intensity value based on certain operating conditions. Using a lookup table, the microprocessor 100 outputs an analog level corresponding to a digital word to a lamp driver 103. The analog level represents the desired illumination intensity. The lamp driver 103 drives the lamps 58 accordingly. Preferably, each lamp 58 is individually monitored and adjusted to the desired intensity. This permits the lighting assembly 40 to account for fluctuations in the performance of each lamp 58, which can vary greatly as the age of the lamps 58 increase.

The intensity of the lamps 58 may be controlled in response to several different parameters. In the present invention, the intensity of the lamps 58 is controlled in relation to: 1) the speed of the conveyor 18; and 2) the height of each package being scanned. With respect to the speed of the conveyor 18, with a fixed resolution CCD system, a line of data is acquired for a fixed distance of conveyor 18 travel. The time required to travel the distance varies with the speed of the conveyor 18. Accordingly, the exposure time for a line of data is equal to the time required to travel the fixed distance. At slower conveyor 18 speeds, the exposure time is longer than at higher conveyor 18 speeds. Accordingly, a lower illumination intensity is required for longer exposure times.

A conveyor 18 tachometer 110 outputs a signal to the microprocessor 100, which determines the desired intensity value for that particular conveyor speed. The microprocessor 100 outputs an analog level to the lamp driver 103 and the intensity of the lamps 58 is adjusted accordingly. At slower conveyor 18 speeds, a lower illumination level is desired. This results in lower power consumption and increased operator comfort level.

The intensity of the lamps 58 may also be controlled in relation to the height of each package being scanned. For packages which are shorter, and thus further away from the scanner, a higher illumination intensity is required to keep a constant signal-to-noise ratio in the CCD detected images. For taller packages which are closer to the scanner, a lower illumination intensity is required. The package height detector 111 may comprise a light curtain, as shown in FIG. 1, or any other type of conventional height detecting means. The height detector 111 determines the height of a package and forwards this information to the microprocessor 100. The microprocessor 100 determines the desired intensity value for that particular package height. As would be appreciated by those skilled in the art, package height and conveyor speed may be simultaneously considered to calculate an optimum lighting intensity.

Figure 9:
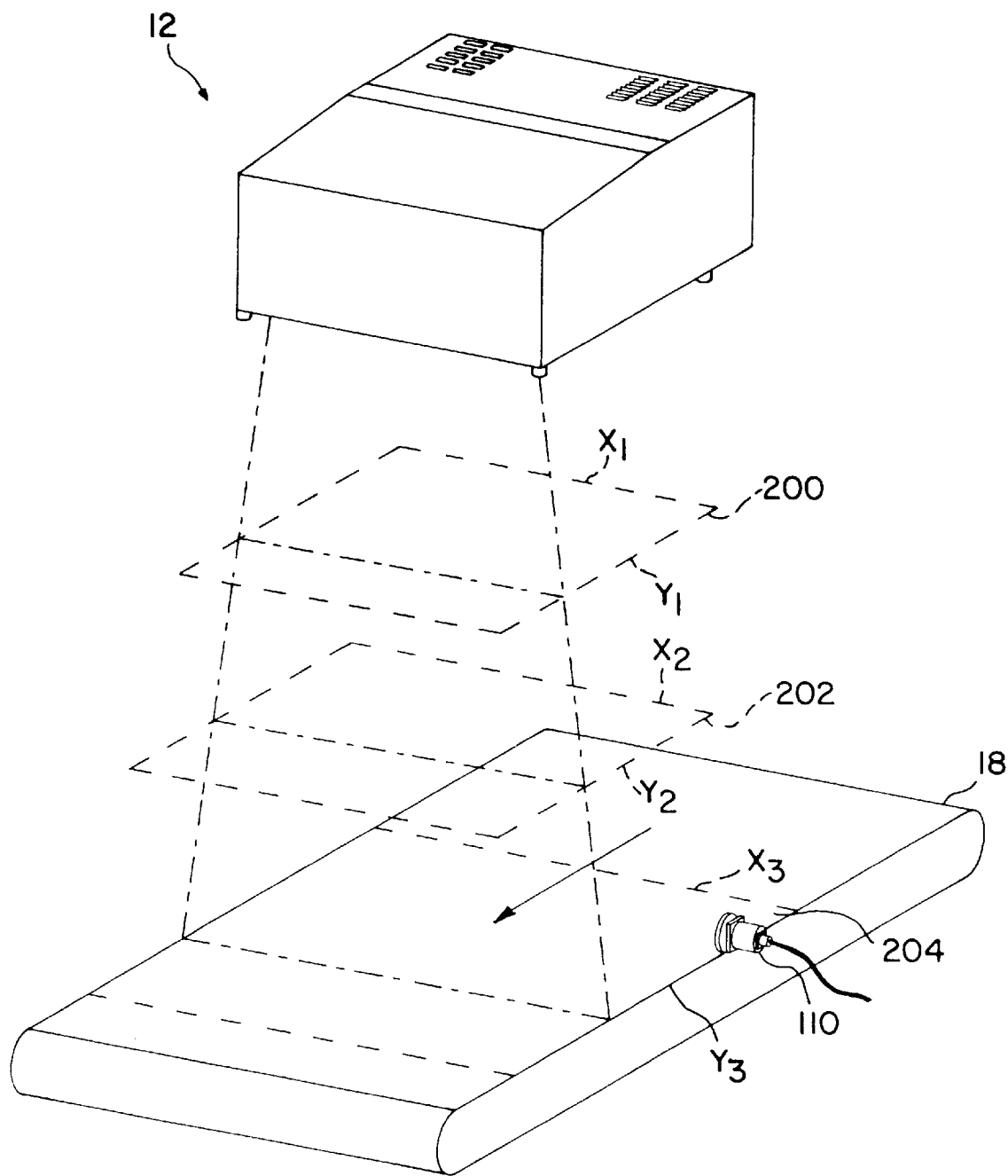
FIG. 9 is a perspective view of the present invention showing the resolution of the scanning system.
Figure 3B:
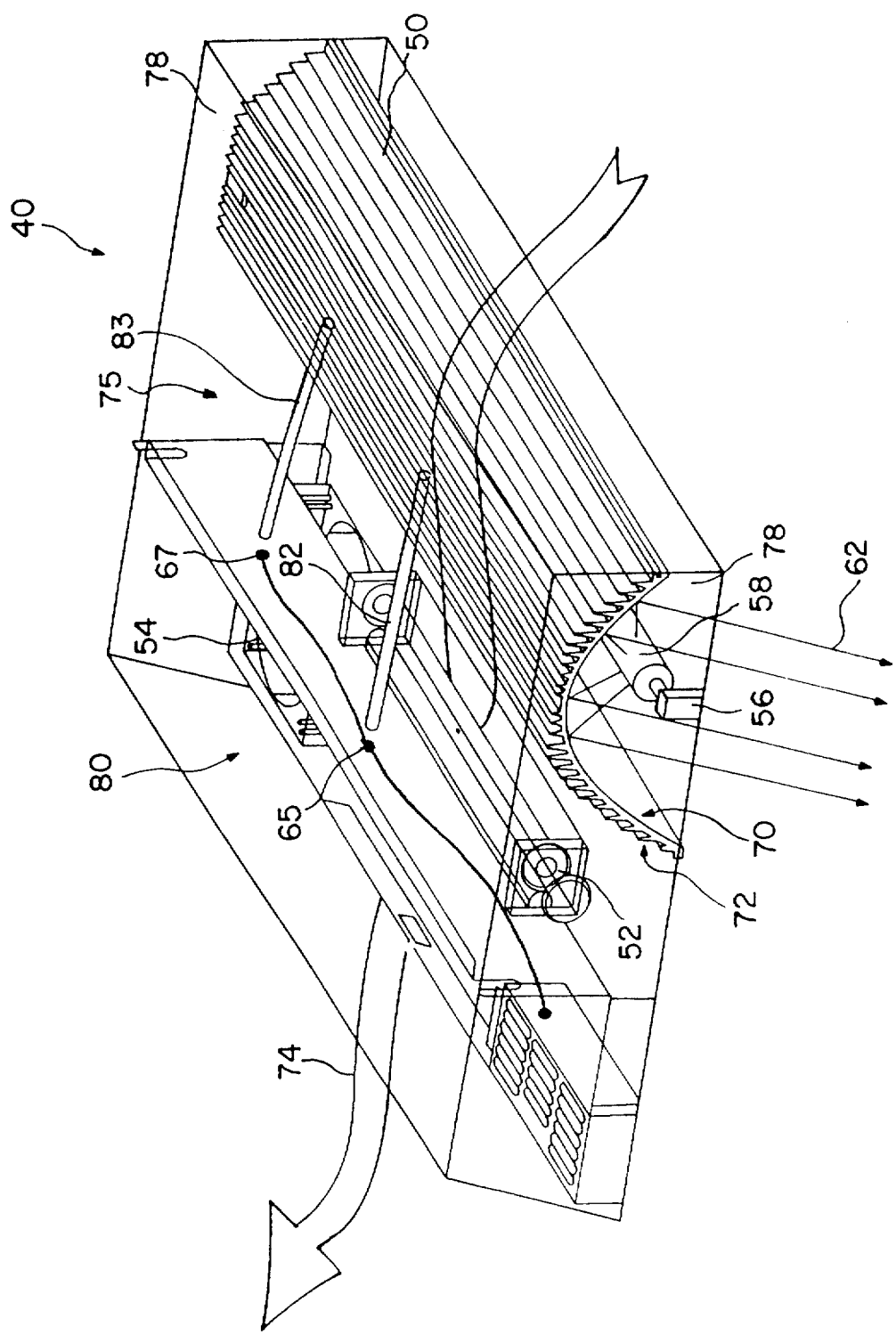

In another aspect of the invention, tachometer resealing is used to directly control the CCD line rate, (or resolution), of the imaging apparatus 12 along the direction of travel. As shown in FIG. 9, the resolution of the imaging apparatus 12 across the width of the conveyor 18 varies with the distance of an object from the imaging apparatus 12. Imaging inaccuracies may result if this variation in the resolution is not taken into consideration by the imaging apparatus 12 while imaging a bar code located on the package. This is particularly critical in applications where time delayed integration (TDI) CCD detectors are used, since the shifting of the charge must be closely coupled with object motion to maintain accurate image resolution.

An example of the variation in scanning resolution is shown in FIG. 9. The imaging apparatus 12 may scan packages at a plurality of heights 200, 202, 204. The tachometer 110 produces an output signal which is proportional to the speed of the conveyor 18. One pulse is generated for every 0.01 inches of conveyor travel, which is designated the "y" direction. Thus, the resolution of the imaging apparatus 12 is constant in the Y direction. At height 200 the field of view $X_1$ of CCD detector will be relatively small in the X direction. This results in high resolution in the X direction. At height 202, the field of view $X_2$ is larger than the field of view $X_1$ at height 200. However, since the same number of pixels on the CCD detector image the wider field of view $X_2$, the resolution in the X direction has decreased. At this height 202, the resolution in the X direction is equal to the resolution in the Y direction $Y_2$. At height 204 the field of view $X_3$ has again increased, thereby decreasing the resolution in the X direction. Accordingly, the resolution in the X direction at height 204 will be less than the resolution in the Y direction. This variation of resolution in the X direction due to package height causes imaging anomalies and decoding inaccuracies.

Figure 10:
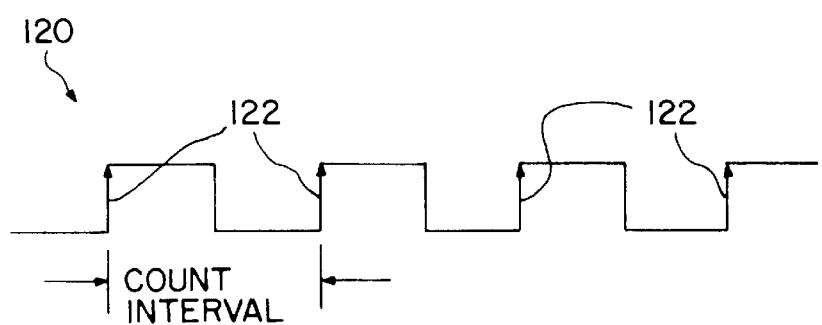
FIG. 10 is the square wave output signal from the tachometer.

Referring to FIG. 10, the signal that tachometer 110 produces is a 50% duty cycle square wave 120 which is output to the microprocessor 100. The microprocessor 100 digitally samples the square wave 120 and a raw digital count corresponding to the time between rising edges 122 is obtained. Using a lookup table, the microprocessor 100 obtains a scaling factor, which is a function of the lens focal length and object distance. The microprocessor 100 applies this scaling factor to the raw digital count and generates a rescaled digital count. The rescaled digital count provides the CCD line clock signal, which is output to the CCD detector. Accordingly, the CCD line clock rate is modified to maintain a 1:1 magnification ratio in both the X and Y directions. For example, if a package is tall, and thus close to the imaging apparatus 12, the CCD line clock rate must be increased. The microprocessor 100 obtains the raw digital count and accesses the lookup table for a scaling factor. At this height, the scaling factor may be on the order of ten per-cent. The raw digital count is multiplied by 1.1 to provide an increased CCD line clock signal. Implementation of the resealing method as described will provide greatly improved performance of TDI based CCD detectors in large depth of field applications.

Although the invention has been described in part by making detailed reference to the preferred embodiment, such detail is intended to be instructive rather than restrictive. It will be appreciated by those skilled in the art that many variations may be made in the structure and mode of operation without departing from the spirit and scope of the invention as disclosed in the teachings herein.

What is claimed is:

1. An apparatus for imaging an object within a predetermined region comprising:
   means for illuminating the region comprising:
      means for producing light;
      reflector means for directing said light toward said region; and
      said reflector means including means integral with said reflector means for removing heat generated by said light producing means;
   detecting means for receiving reflected light from said object when disposed within the region;
   means for focusing reflected light onto said detecting means; and
   means for monitoring the intensity of said light producing means comprising a photo sensitive element and means for transmitting light from said light producing means to said element.

2. The apparatus of claim 1 wherein said transmitting means comprises a thermally conductive tube for thermally insulating said element from said light producing means.

3. An apparatus for imaging an object within a predetermined region comprising:
   means for illuminating the region comprising:
      means for producing light;
      reflector means for directing said light toward said region,
      said reflector means including means integral with said reflector means for removing heat generated by said light producing means;
   detecting means for receiving reflected light from said object when disposed within the region, said light detecting means comprising a CCD camera head unit having a CCD detector and an image processor; and
   means for focusing reflected light onto said detecting means.

4. The apparatus of claim 3 further comprising:
   a conveyor, for moving objects past said light detecting means; and
   means for resealing the line clock of the CCD detector comprising:
      means for measuring the speed of said conveyor;
      means for determining the distance between the object and said light detecting means; and means for calculating a new line clock rate based upon said speed and said distance.

5. An apparatus for imaging an object within a predetermined region comprising:
means for illuminating the region comprising:
means for producing light;
reflector means for directing said light toward said region,
said reflector means including means integral with said reflector means for removing heat generated by said light producing means;
detecting means for receiving reflected light from said object when disposed within the region;
means for focusing reflected light onto said detecting means;
means for determining the distance between the object and said light detecting means; and
means for modulating the intensity of said light producing means, said modulating means being responsive to said distance.

6. The apparatus of claim 5 wherein said modulating means increases the intensity of said light producing means as said distance increases and decreases the intensity of said light producing means as said distance decreases.

7. The apparatus of claim 6 further including means for determining the speed of the object relative to said light detecting means, said modulating means being further responsive to said speed.

8. The apparatus of claim 7 wherein said modulating means increases the intensity of said light producing means as said speed increases and decreases the intensity of said light producing means as said speed decreases.

9. An apparatus for imaging an object within a predetermined region comprising:
means for illuminating the region comprising:
means for producing light;
reflector means for directing said light toward said region
said reflector means including means integral with said reflector means for removing heat generated by said light producing means;
detecting means for receiving reflected light from said object when disposed within the region; and
means for focusing reflected light onto said detecting means;
said heat removing means comprising a plurality of thermally conductive heatsink fins, and said illuminating means further comprising a blower for producing a flow of air across said heatsink fins to remove heat, said flow of air being transverse to said heatsink fins,
said light producing means, said reflector means and said blower being housed in a compartment separate from other compartments of said imaging apparatus, thereby providing distinct thermal separation between said compartments.

10. The apparatus of claim 9, further comprising an electronic compartment adjacent to said separate compartment, the flow of air across said fins isolating and preventing degradation of components in said electronics compartment by the heat from said light producing means.

11. The apparatus of claim 10 comprising means for directing said flow of air so as to continue adjacent to said electronics compartment after passing across said fins.

12. The apparatus of claim 11 further comprising a fan for removing heat from said electronics compartment.

13. The apparatus of claim 9, wherein the ends of the fins of the reflector means are suspended directly at the sidewalls of the separate compartment whereby heat is radiated along the fins and onto the sidewalls.

14. An apparatus for imaging an object within a predetermined region comprising:
means for illuminating the region comprising:
means for producing light;
reflector means for directing said light toward said region; and
said reflector means including means integral with said reflector means for removing heat generated by said light producing means;
detecting means for receiving reflected light from said object when disposed within the region; and
means for monitoring the intensity of said light producing means comprising a photo sensitive element and means for transmitting light from said light producing means to said element.

15. An apparatus for imaging an object within a predetermined region comprising:
means for illuminating the region comprising:
means for producing light;
reflector means for directing said light toward said region,
said reflector means including means integral with said reflector means for removing heat generated by said light producing means; and
detecting means for receiving reflected light from said object when disposed within the region, said light detecting means comprising a CCD camera head unit having a CCD detector.

16. An apparatus for imaging an object within a predetermined region comprising:
means for illuminating the region comprising:
means for producing light;
reflector means for directing said light toward said region
said reflector means including means integral with said reflector means for removing heat generated by said light producing means;
detecting means for receiving reflected light from said object when disposed within the region;
said heat removing means comprising a plurality of thermally conductive heatsink fins, and said illuminating means further comprising a blower for producing a flow of air across said heatsink fins to remove heat, said flow of air being transverse to said heatsink fins,
said light producing means, said reflector means and said blower being housed in a compartment separate from other compartments of said imaging apparatus, thereby providing distinct thermal separation between said compartments.

17. An apparatus for imaging an object within a predetermined region comprising:
means for illuminating the region comprising:
means for producing light;
reflector means for directing said light toward said region; and
said reflector means includes means integral with said reflector means for removing heat generated by said light producing means;
detecting means for receiving reflected light from said object when disposed within the region; and
means for focusing reflected light onto said detecting means;
said illuminating means further comprising aperture means which selectively blocks illumination from said light producing means to provide an even illumination intensity in said region.

* * * * *

UNITED STATES PATENT AND TRADEMARK OFFICE
CERTIFICATE OF CORRECTION

PATENT NO. : 5,814,802 Page 1 of 2
DATED : September 29, 1998
INVENTOR(S) : Hecht et al.

It is certified that error appears in the above-identified patent and that said Letters Patent is hereby corrected as shown below:

In claim 4, column 6, line 63, delete "resealing" and insert therefor --rescaling--.

In the drawings,
On sheet 4, delete Fig. 3B and insert therefor attached Fig. 3B.

Signed and Sealed this

Fourth Day of May, 1999

Attest:

Q. TODD DICKINSON

*Attesting Officer*  *Acting Commissioner of Patents and Trademarks*